March 10, 1959 H. H. DETAMORE ET AL 2,876,848
PROPELLER MECHANISM
Filed Jan. 15, 1954 15 Sheets-Sheet 1

INVENTORS
Harold H. Detamore
Richard A. Hirsch
BY
Craig V. Morton
Attorney

March 10, 1959  H. H. DETAMORE ET AL  2,876,848
PROPELLER MECHANISM
Filed Jan. 15, 1954  15 Sheets-Sheet 4

Fig.3

INVENTORS
Harold H. Detamore
BY Richard A. Hirsch
Craig V. Morton
Attorney

INVENTORS
Harold H. Detamore
Richard A. Hirsch
BY

Craig V. Morton
Attorney

March 10, 1959    H. H. DETAMORE ET AL    2,876,848
PROPELLER MECHANISM

Filed Jan. 15, 1954    15 Sheets-Sheet 6

INVENTORS
Harold H. Detamore
Richard A. Hirsch
BY
Craig V. Morton
Attorney

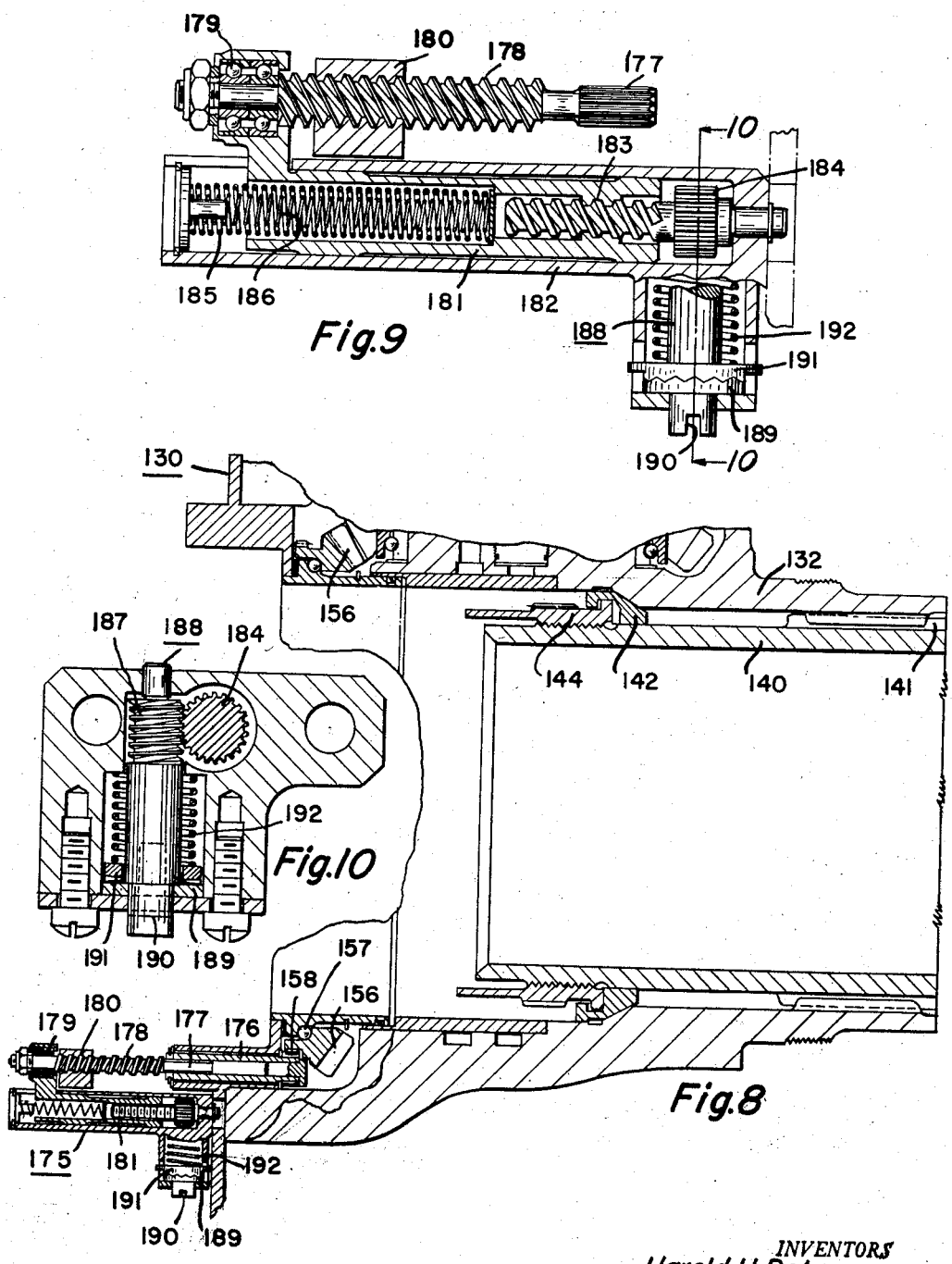

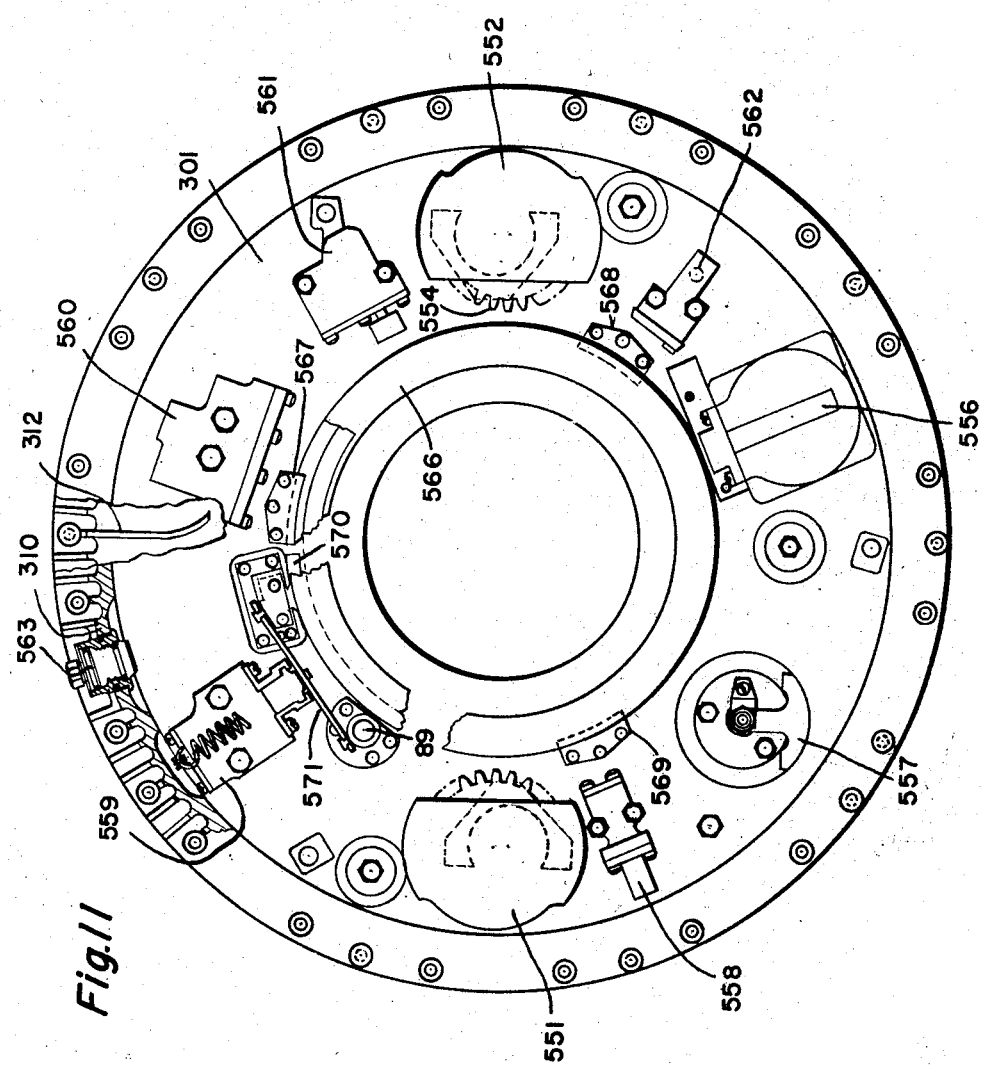

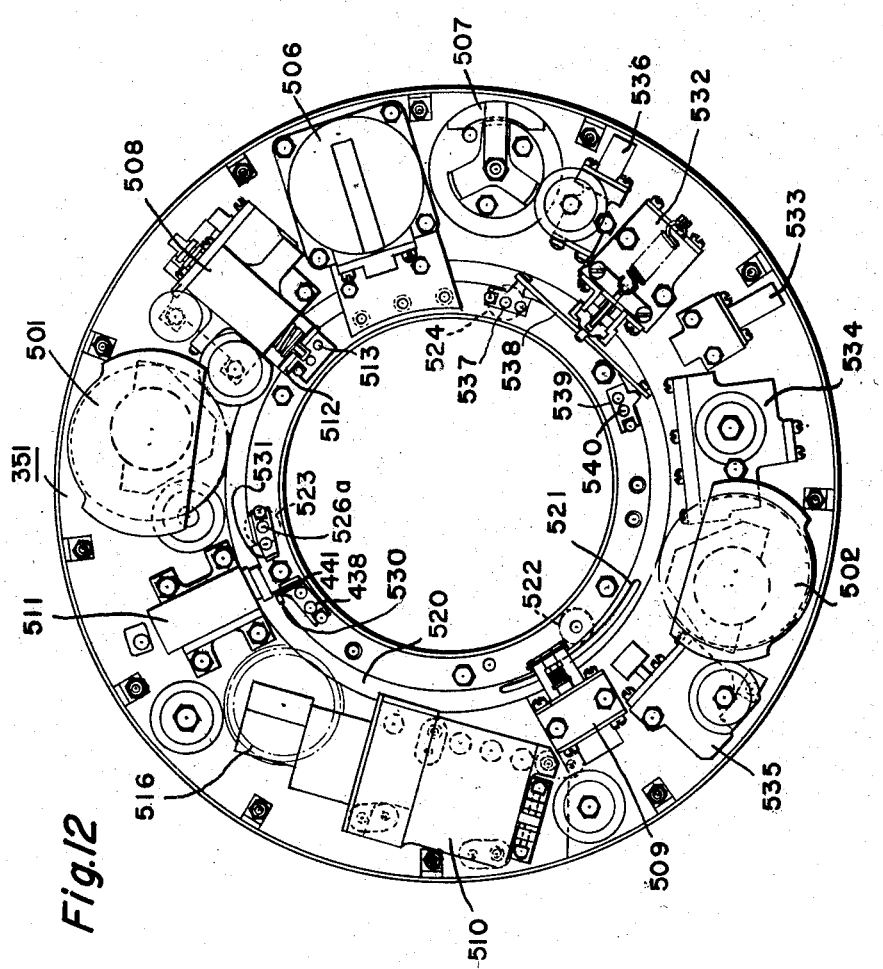

March 10, 1959 H. H. DETAMORE ET AL 2,876,848
PROPELLER MECHANISM

Filed Jan. 15, 1954 15 Sheets-Sheet 11

INVENTOR.
Harold H. Detamore
Richard A. Hirsch
BY
Craig V. Morton
Attorney

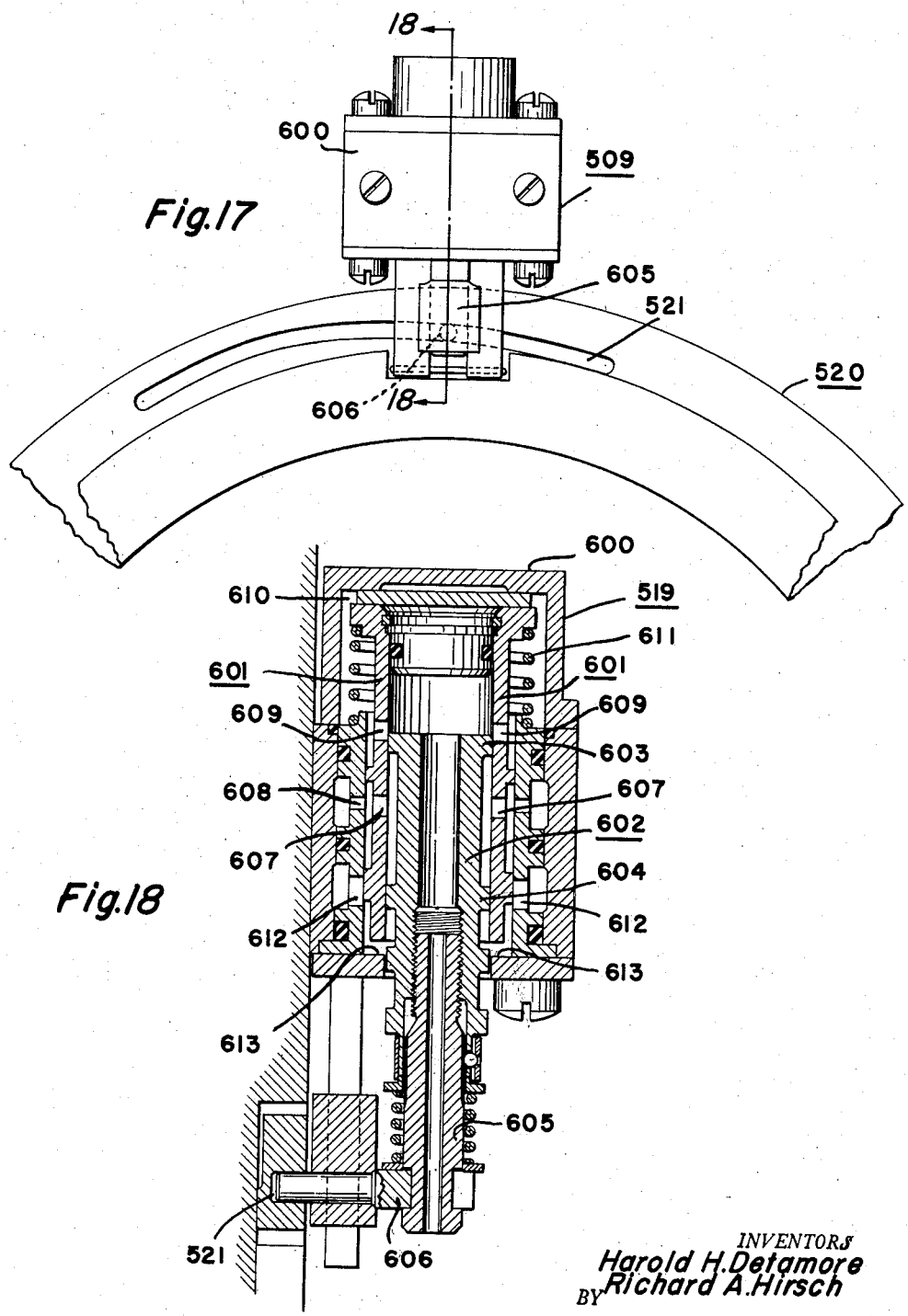

March 10, 1959    H. H. DETAMORE ET AL    2,876,848
PROPELLER MECHANISM
Filed Jan. 15, 1954    15 Sheets-Sheet 14

INVENTORS
Harold H. Detamore
Richard A. Hirsch
BY
Craig V. Morton
Attorney

United States Patent Office 2,876,848
Patented Mar. 10, 1959

2,876,848
PROPELLER MECHANISM

Harold H. Detamore, Frederick, Md., and Richard A. Hirsch, West Milton, Ohio, assignors to General Motors Corporation, Detroit, Mich., a corporation of Delaware Application January 15, 1954, Serial No. 404,346

21 Claims. (Cl. 170—135.27)

This invention pertains to a propeller, and more particularly to variable pitch propellers of the dual or contra-rotation type.

Among our objects are the provision of means for effecting substantially coincident pitch adjustment of the blades of inboard and outboard propeller elements of a dual rotation propeller; the further provision of a single regulator for housing the control units for effecting pitch adjustment of the inboard and outboard propeller elements; and the still further provision of simplified mechanism for coordinating the pitch adjustment of both propeller elements. The aforementioned and other objects are accomplished in the present invention by providing a blade angle actuator within the control unit of the inboard propeller, means within the inboard control unit for effecting operation of the actuator, and means operatively connected with and movable by the actuator for controlling the coincident application of power by both control units to the blade adjusting means of both propeller elements.

Specifically, the inboard and outboard propeller elements are connected to rotate with a pair of coaxial propeller shafts that are rotated in opposite directions by a prime mover, such as a turbine. The regulator is mounted between the inboard and outboard propeller hubs and comprises a unitary cover rotatable with the outboard propeller hub and two control units, one of which rotates with the outboard hub and the other of which rotates with the inboard hub. The regulator assembly forms a common oil reservoir for the control units of both propeller elements, and to prevent violent turning of the oil in the common reservoir, the inboard control unit is provided with a shroud.

Each control unit includes fluid pressure developing pumps, and a plurality of control valves and tube assemblies for directing the flow of fluid to and from the blade adjusting servo-motors, or torque units. The torque units are mounted on the propeller hubs in which blades are rotatably supported for pitch adjustment. In addition, the inboard control unit includes a fluid pressure operated, blade angle actuator, hydraulic governing means for controlling the actuator, a dual low pitch stop valve for limiting actuator movement, and blade angle control means for controlling actuator operation in lieu of the governing means. In addition, each propeller hub carries a pitch lock valve, which is operable to seal off the increase pitch chambers of the torque units in its respective hub so as to prevent a decrease in the pitch position of the blades upon a loss of hydraulic pressure in the respective hub's control unit. The actuator controls the position of a ring gear, or regulator control gear, which is operatively connected to a rotatable master shaft. The master shaft, in turn, is operatively associated with the means for coincidentally positioning the distributor valve in both control units so as to effect concurrent pitch adjustment of the blades in both propeller elements by the application of fluid pressure to the several torque units. Each propeller element also has associated therewith a feedback mechanism, which follows up the blade movement of its respective propeller element and repositions its control unit distributor valve to stop the flow of pressure fluid to and from the torque units, when the blade angle change demanded by the actuator has been accomplished by the blades.

The propeller assembly also includes a control housing which is mounted between the prime mover and the inboard hub. The control housing contains the necessary coordinating mechanism between the prime mover and the propeller assembly, and rotates with the inboard hub. A manual control lever and a synchronizing lever, with their associated linkages are disposed within the control housing, and are operatively connected with the inboard control unit of the regulator.

Further objects and advantages of the present invention will be apparent from the following description, reference being had to the accompanying drawings wherein a preferred embodiment of the present invention is clearly shown, and wherein like parts are denoted by like numerals throughout the several views.

In the drawings:

Fig. 3 is a view in elevation of the outboard hub taken in the direction of arrow 3 in Fig. 1.

Fig. 8 is a fragmentary sectional view taken along line 8—8 of Fig. 7.

Fig. 9 is an enlarged view, partly in section and partly in elevation, of the mechanism within circle 9 of Fig. 8.

Fig. 10 is a sectional view taken along line 10—10 of Fig. 9.

Fig. 11 is a view, partly in section and partly in elevation, of the outboard control unit within the regulator assembly.

Fig. 12 is a view, in elevation, of the inboard control unit within the regulator assembly.

Fig. 17 is an enlarged fragmentary view, in elevation of the actuating mechanism for the dual low pitch stop valve associated with the inboard control unit.

Fig. 18 is an enlarged sectional view of the dual low pitch stop valve taken along line 18—18 of Fig. 17.

Fig. 19 is a view, partly in section and partly in elevation, of the beta selector valve.

Fig. 20 is a view taken in the direction of arrow 20 in Fig. 19.

Fig. 21 is a sectional view taken along line 21—21 of Fig. 20.

Figs. 22 through 25 are sectional views taken, respectively, along lines 22—22, 23—23, 24—24 and 25—25 of Fig. 19.

Figure 26:
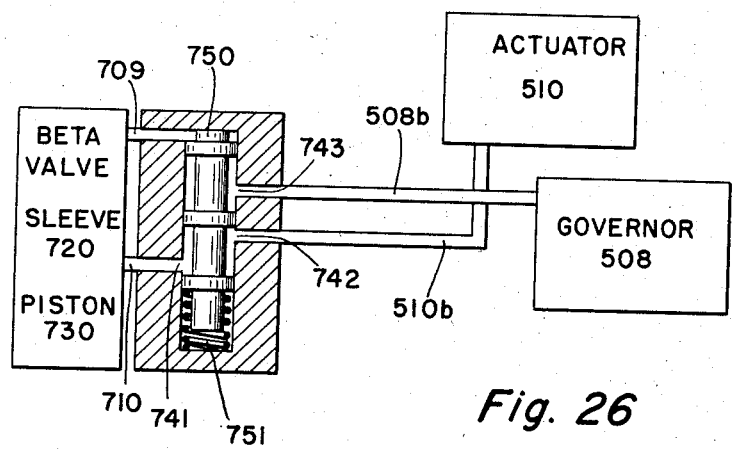

Figure 26 is a schematic view depicting the position of the governor and beta selector valve wherein the beta valve is connected to the blade angle actuator.

Figure 27:
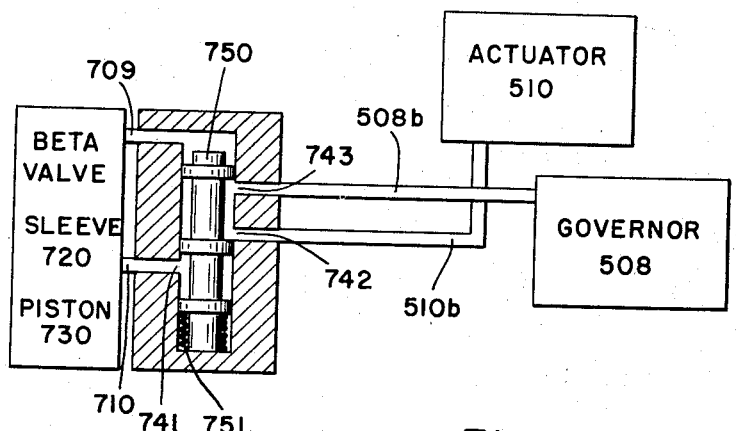

Figure 27 is a schematic view depicting the position of the governor and beta valve wherein the governor valve assembly is connected to the blade angle actuator.

Figure 1:
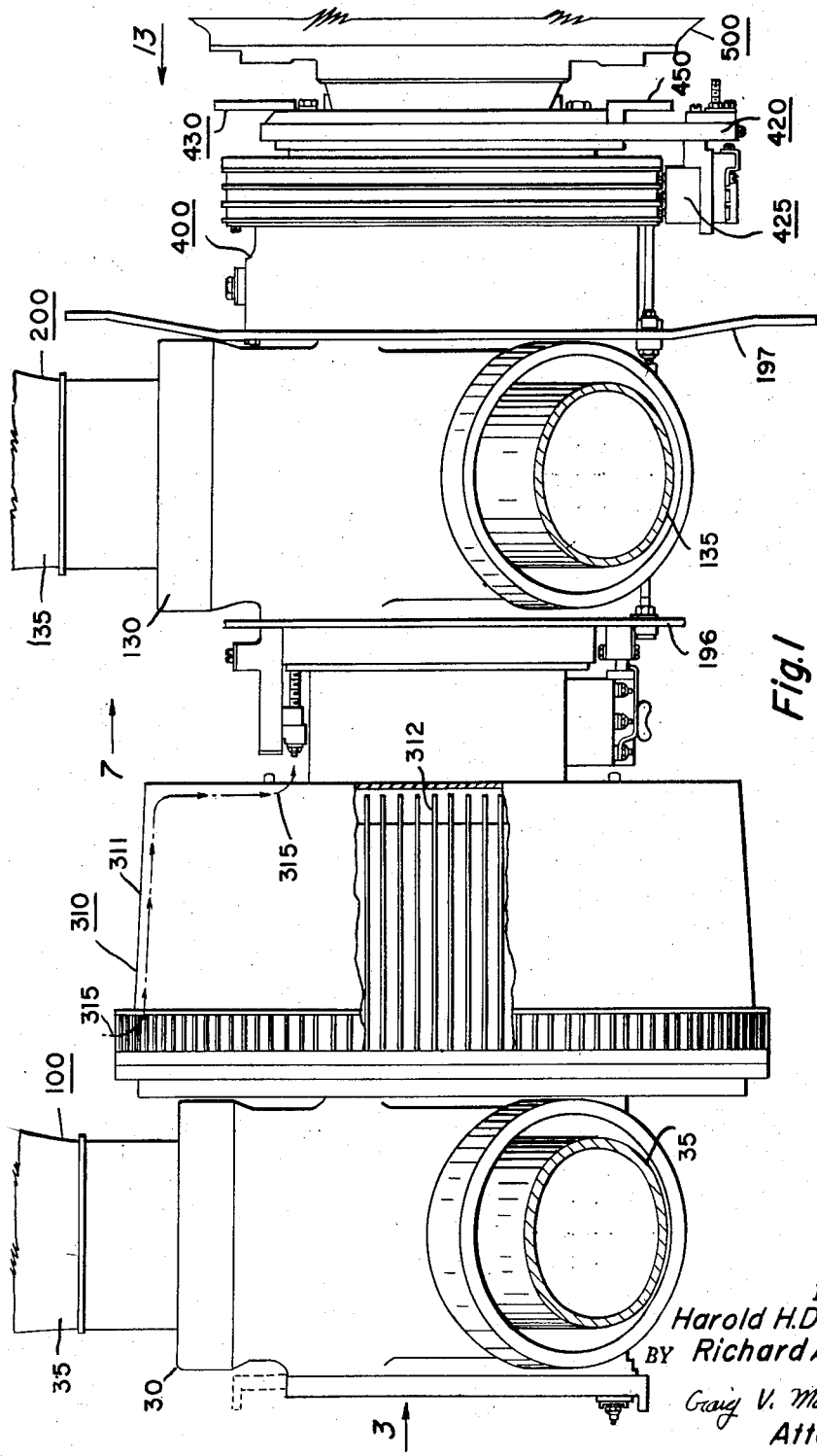
Fig. 1 is a view partly in elevation and partly in section of the propeller assembly of this invention.

With reference to Fig. 1, the numeral 100 generally indicates an outboard propeller element and the numeral 200 generally designates an inboard propeller element. The outboard propeller element 100 comprises a hub 30 having a plurality of radially extending sockets within which propeller blades 35 are journaled for rotation about their longitudinal axes. The blades 35 are mounted for rotation relative to the hub 30 in a manner generally disclosed in the Blanchard et al., Patents 2,307,101 and 2,307,102, and more particularly in the manner disclosed and claimed in copending application, Serial No. 359,104, filed June 2, 1953, now Patent No. 2,734,587, in the name of Richard A. Hirsch. The hub 30 has secured thereto and rotatable therewith a cover 310 of a regulator designated generally by the numeral 300. The regulator 300 houses control units for effecting propeller operation in the regimes of constant speed governing, feathering and negative thrust, which control units will be described hereinafter. The inboard and outboard propeller elements are axially spaced, and, as shown in Fig. 1, the regulator 300 is disposed therebetween. The propeller element 200, likewise, comprises a hub 130 having a plurality of radially extending sockets within which propeller blades 135 are supported for rotation about their longitudinal axes. The inboard propeller hub 130 has secured thereto and rotatable therewith a control housing 400 within which the coordinating mechanism between a prime mover, indicated by the numeral 500, and the propeller assembly, is disposed.

Figure 2:
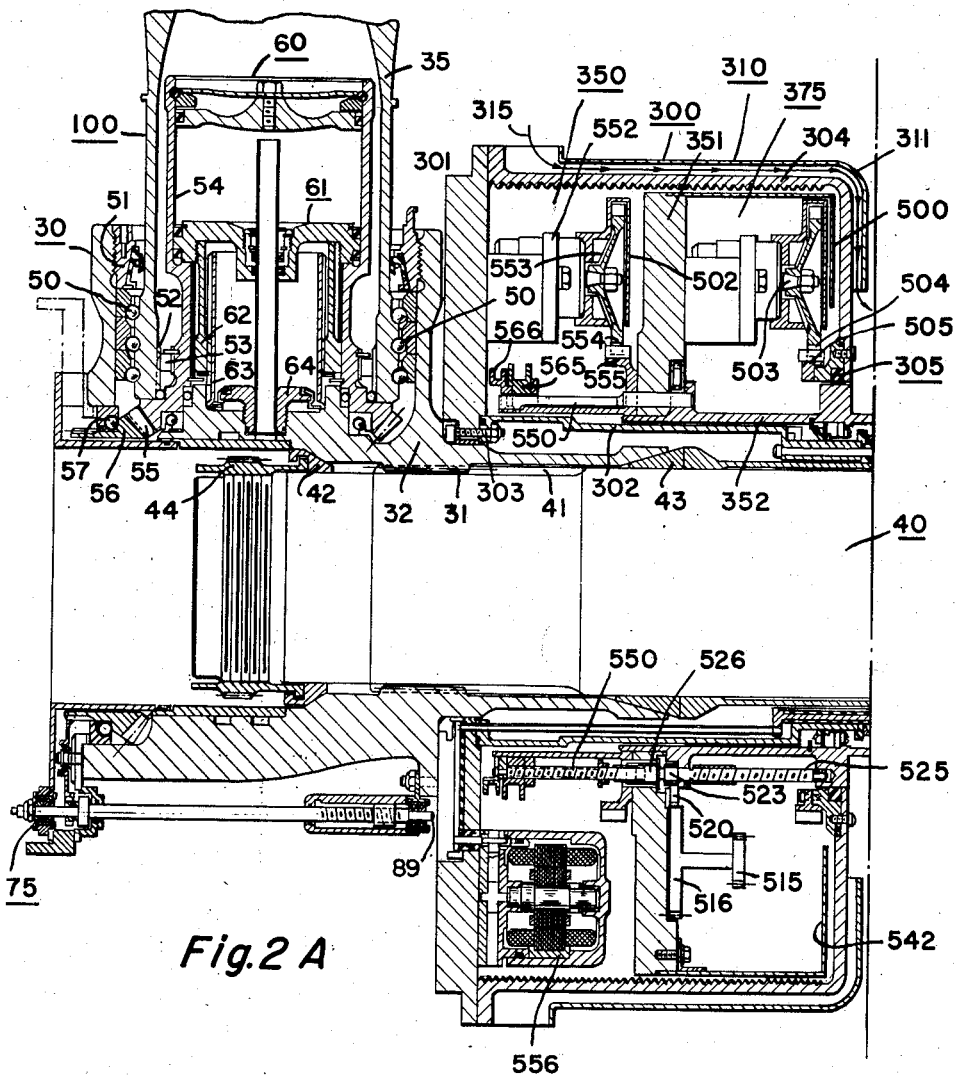
Figs. 2A and 2B are enlarged, composite sectional views of the propeller assembly shown in Fig. 1.
Figure 2B:
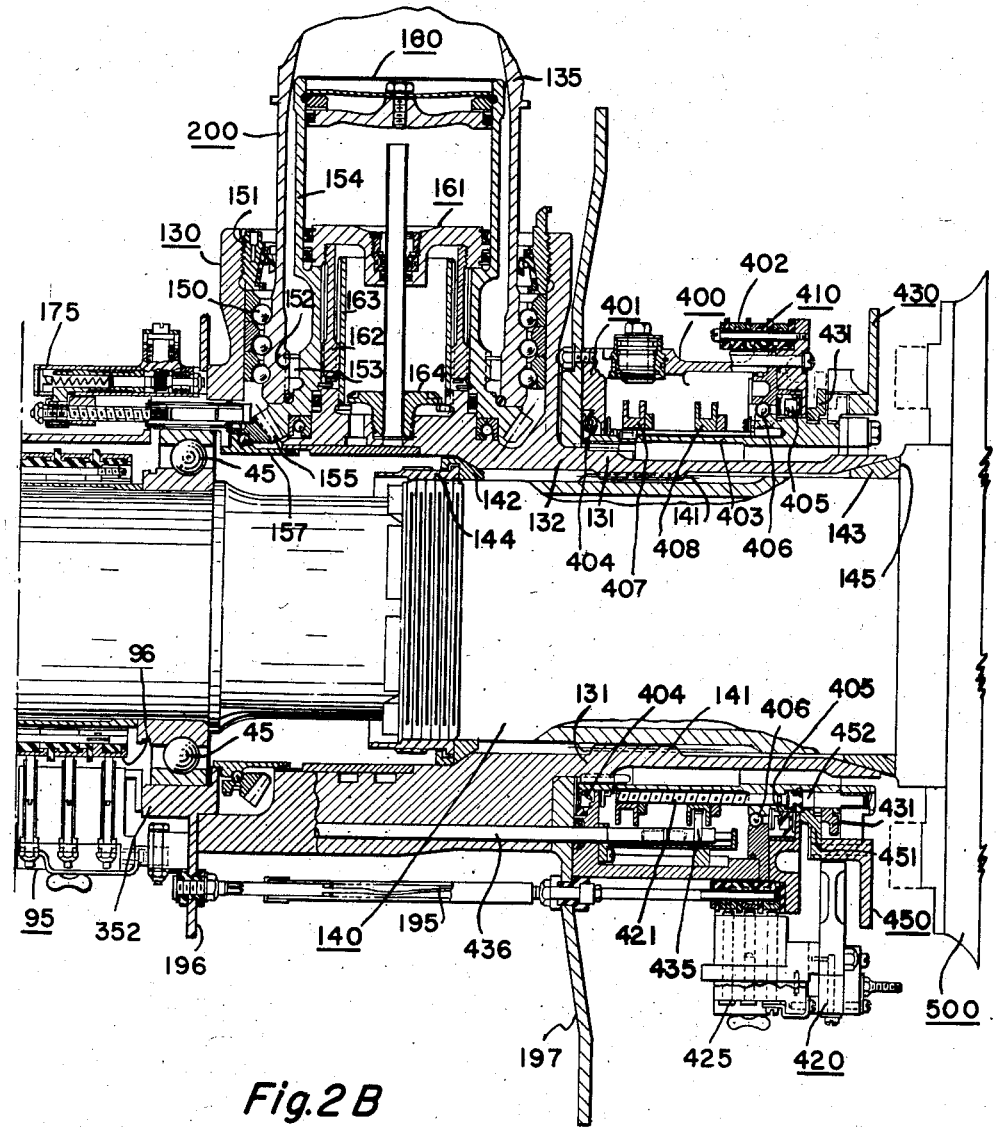

With particular reference to Figs. 2A and 2B, it may be seen that the hubs 30 and 130 of the inboard and outboard propeller elements are secured to oppositely rotatable, hollow, concentric shafts 40 and 140. The shafts 40 and 140 are driven through gear reduction means, not shown, by the prime mover indicated generally by the numeral 500. The shaft 40 is provided with a plurality of straight spline teeth 41, which teeth mate with straight spline teeth 31 formed on the inner peripheral surface of a hub sleeve 32 extending axially of the hub 30. The hub 30 is clamped to the shaft 40 by means of front and rear cone assemblies 42 and 43. The exterior surface of the outer portion of shaft 40 is provided with threads, which are engaged by an annular nut 44 for drawing the cone assemblies 42 and 43 together to securely anchor the hub 30 to the shaft 40.

The regulator cover 310 includes a front plate 301, which is seated in a recess in the sleeve portion 32 of the outboard hub 30. An annular member 302 forming the inner wall of an oil reservoir formed by the regulator cover 310, is attached to the front plate 301 by means of bolts 303, the front plate 301 being attached to the hub 30, so that both the front plate 301 and the annular member 302 rotate with the outboard propeller element 100. The cover 310 also includes a generally cup-shaped member 304 which is bolted to the plate 301 so as to rotate therewith. The front plate 301 constitutes a part of the outboard control unit, indicated generally by the numeral 350.

The regulator 300 also includes a second annular plate 351, which is attached to an adapter sleeve 352 that is disposed within the regulator 300 and concentric with, though radially spaced from the annular member 302. The adapter sleeve 352, as is seen in Fig. 2B, is attached to the hub 130 of the inboard propeller element 200, and, accordingly, rotates therewith. The annular plate 351 constitutes a part of the inboard control unit of the regulator 300, which is designated generally by the numeral 375. As is apparent from an inspection of Fig. 2A, the regulator cover assembly 310 and the annular member 302, form a torus-shaped reservoir within which a quantity of hydraulic fluid is contained. Suitable sealing means 305 are carried by the inboard pump power gear adapter, which is bolted to cover 304, to prevent the leakage of fluid between the oppositely rotating parts 304 and 352.

Referring more particularly to Fig. 2B, it may be seen that the inboard shaft 140 is rotatably supported by bearing means 45 upon the oppositely rotating outboard shaft 40. The inboard shaft 140 is, likewise, provided with a straight splined portion 141, which mates with a straight splined portion 131 on axially extending sleeve 132 of the inboard hub 130. The end portion of shaft 140 is, likewise, threaded and receives a nut 144, which draws front and rear cone assemblies 142 and 143 together, to securely clamp the inboard hub 130 to the shaft 140. The rear cone assembly 143 is maintained in engagement with a shoulder 145 formed on the shaft 140. The inboard propeller hub 130 has attached thereto an annular plate 401 forming the front wall of the control housing 400. The control housing 400 also includes a cup-shaped member 402, which is attached to the front plate 401 so as to rotate with the inboard hub 130. The cup-shaped member 402 carries a slip ring assembly, indicated generally by the numeral 410. The control housing 400 also includes a stationary adapter sleeve 403, which forms the inner wall of the housing 400, suitable sealing means 404 and 405 being provided between the movable and stationary parts of the housing 400, so as to form a torus-shaped oil reservoir. Bearing means 406 are also provided between the rotating cover 400 and the stationary adapter sleeve 403, which is attached to a stationary adapter plate 420 that carries a brush assembly 425 having electrical engagement with the slip ring assembly 410. The mechanism disposed within the control housing 400 will be more fully described hereinafter, and suffice it here to say that a pair of control rings 407 and 408 are mounted on the adapter sleeve 403 for axial movement relative thereto. Each control ring is provided with a plurality of threaded openings in which high lead screws are threadedly received, one of the high lead screws 421 being shown in Figure 2B.

Referring again to Fig. 2A, it may be seen that propeller blade 35 is rotatably journaled within a socket of the hub 30 by means of stacked bearings 50 and restrained against longitudinal movement relative to the hub 30 by means of a hub nut 51. The blade 35 has a hollow root portion and an interiorly straight splined portion 52, which engages a splined indexing ring 53. As is more particularly disclosed in the aforementioned copending application, Serial No. 359,104, now Patent No. 2,734,587, the indexing ring 53 is also splinedly connected to the cylinder 54 of a torque unit 60 mounted within the hollow root portion of the blade 35. The torque unit 60 generally comprises a reciprocal piston 61 capable of fluid pressure actuation in either direction, the piston 61 having an axially extending skirt 62, which is provided with helical splines on its interior and exterior peripheral surfaces. The external helical splines of the skirt 62 mate with internal helical splines on the cylinder 54, and the internal helical splines of the skirt 62 mate with a fixed helically splined member 63. The fixed helically splined member 63 is attached to the hub 30 by means of a nut 64. Due to the helical spline connection between the piston 61 and the cylinder 54, it will be apparent that reciprocative movement of the piston 61 will effect rotative movement of the cylinder 54, which will be transmitted to the blade 35 through the indexing ring 53, by which means the pitch position of the blades 35 of the inboard propeller element 100 may be adjusted. It is further to be understood that each propeller blade of the outboard propeller element 100 is provided with its own torque unit. The end of the cylinder 54 disposed adjacent the bottom of the hub socket is provided with an integral toothed portion 55, which constitutes a blade gear. All the blade gears mesh with a master blade gear 56, which is rotatably supported by bearing means 57, the master gear 56 serving to coordinate the pitch adjustment of all blades in the outboard propeller element.

The construction and arrangement of the blades 135 in the inboard propeller element 200 is identical to that heretofore described in connection with the outboard propeller element 100. Accordingly, similar parts of the inboard hub construction are denoted by like numerals of the outboard propeller element prefixed by the numeral 100.

Figure 4:
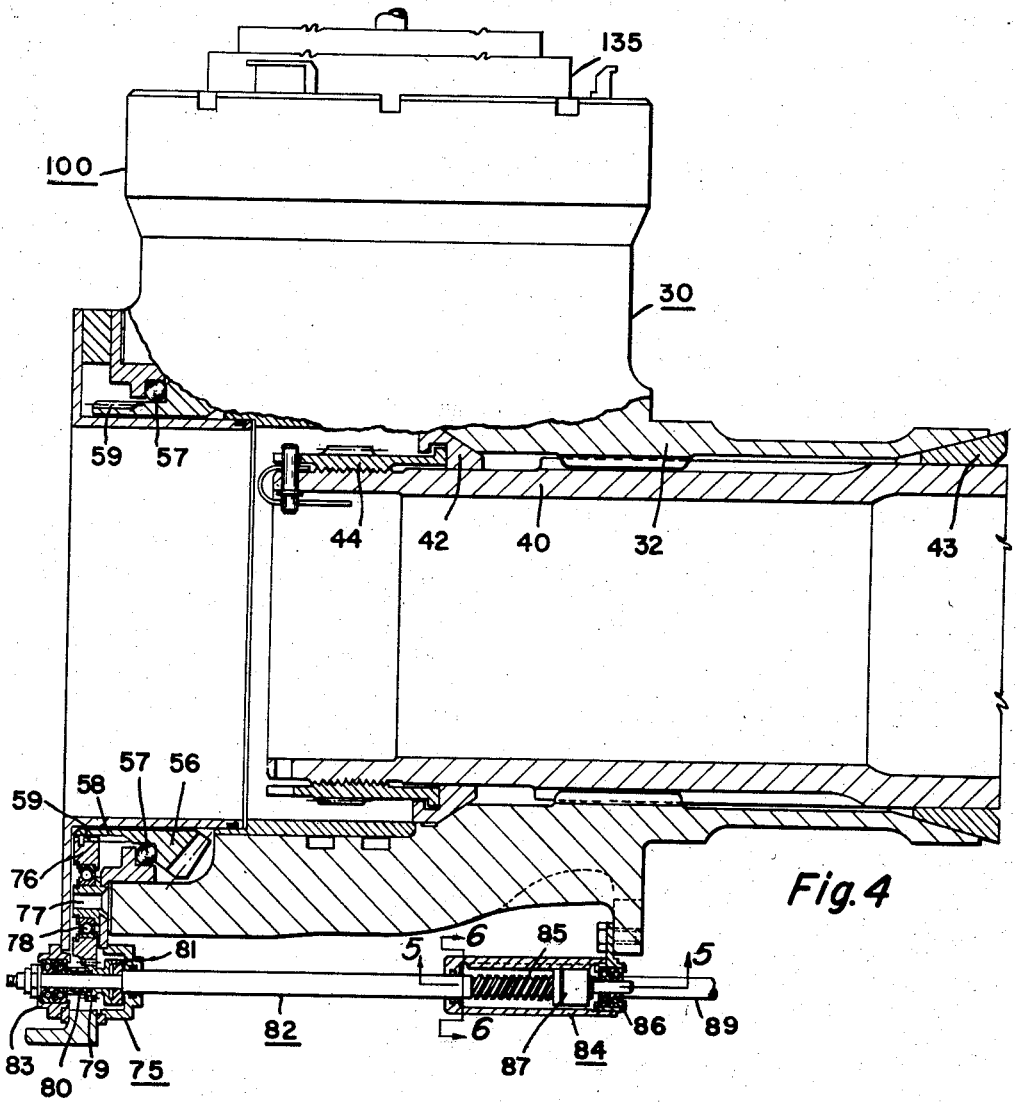
Fig. 4 is an enlarged view, partly in section and partly in elevation, taken generally along the line 4—4 of Fig. 3.

With particular reference to Figures 3 through 6, the feedback mechanism associated with the outboard propeller element 100 will be described. The feedback mechanism is generally indicated by the numeral 75 in Figures 3 and 4, and, as shown in Fig. 4, is operatively associated with the master blade gear 56 of the outboard propeller element 100. The master blade gear 56 includes an axially extending sleeve portion 58, which is externally toothed at 59. The toothed portion 59 meshes with a gear 76, which is rotatably supported about a stub shaft 77 by bearing means 78. The gear 76, in turn, meshes with a pinion gear 79, which is urged to the right, as viewed in Fig. 4, by means of a spring 80. The gear 79 is rotatably connected with a plate member 81, which is pinned to a rotary feedback shaft 82. The rotary feedback shaft 82 is rotatably supported by bearing means 83 and extends longitudinally into a housing 84 supported by the outboard hub 30. The end of the rotary feedback shaft 82, which is disposed within housing 84, is formed as a high lead screw 85, and is rotatably journaled by bearing means 86 within the housing 84.

Figure 6:
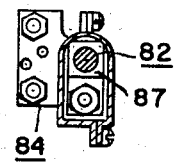
Fig. 6 is a view, partly in section and partly in elevation, taken along line 6—6 of Fig. 4.
Figure 5:
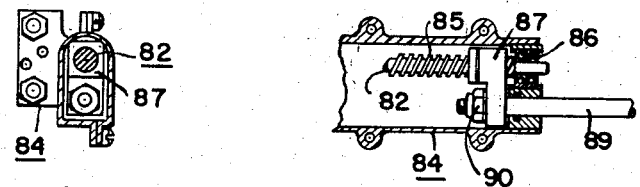
Fig. 5 is a sectional view taken generally along the line 5—5 of Fig. 4.
Figure 7:
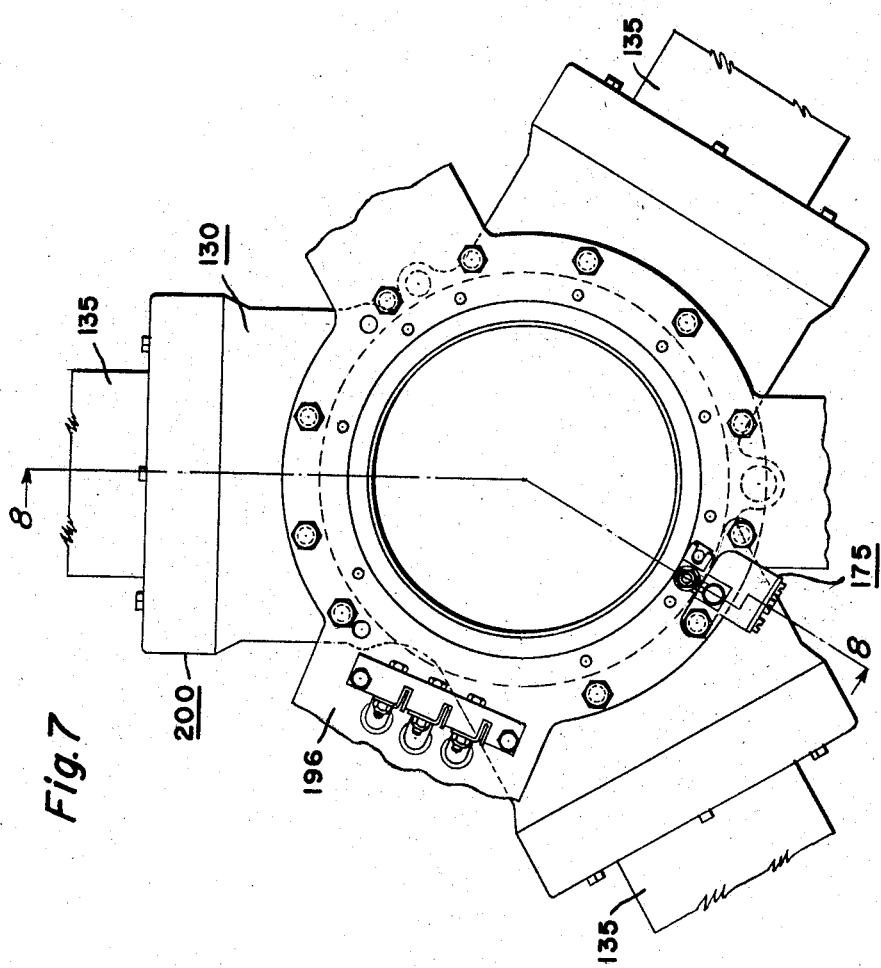
Fig. 7 is a fragmentary view, in elevation, of the inboard hub taken in the direction of arrow 7 in Fig. 1.

Referring particularly to Figs. 4, 5 and 6, it may be seen that the high lead screw portion 85 of the rotary feedback shaft 82 threadedly engages a nut 87, which is restrained against rotation by the housing 84. Accordingly, rotation of the rotary feedback shaft 82 will effect linear movement of the nut 87. The nut 87 is, in turn, attached to a reciprocable feedback rod 89 by means of a threaded assembly 90. The lineally movable feedback rod 89 projects through an end wall of the housing 84 and is operatively associated with the distributor valve of the control unit 350 of the outboard propeller element, in a manner to be described hereinafter. The function of the feedback mechanism 75 is to reposition, or follow-up the distributor valve of the control unit 350 so as to stop the flow of fluid to and from the outboard propeller unit torque units when the blade angle adjustment called for by the blade angle actuator, to be described, has been accomplished by the blades of the outboard propeller element. The rotary feedback mechanism, heretofore described, associated with the outboard propeller element 100, is similar in many respects to the rotary feedback mechanism disclosed in copending application, Serial No. 287,868, filed May 15, 1952, now Patent No. 2,761,517, in the name of Harold H. Detamore, et al.

With particular reference to Figures 7 through 10, the feedback mechanism associated with the inboard propeller element 200 will be described. The feedback mechanism is generally designated by the numeral 175 in Figures 7 and 8. The master gear 156 of the inboard propeller element is formed with an axially extending, exteriorly toothed sleeve portion 158, which meshes with an exteriorly toothed portion of a rotatable sleeve 176. The sleeve 176 has an interiorly straight splined portion, which receives a straight splined portion 177 of a high lead screw shaft 178. The shaft 178 is rotatably journaled by bearing means 179, and threadedly engages a nut 180, which is restrained against rotation. Accordingly, rotation of the shaft 178 will effect linear movement of the nut 180, which is operatively connected to means, to be described, for repositioning the distributor valve of the inboard control unit 375. The rotary feedback mechanism 175, associated with the inboard propeller element, is also provided with adjusting means which comprise means for varying the axial position of the shaft 178 relative to the propeller hub 130.

Referring particularly to Figures 9 and 10, the adjusting means for the feedback mechanism of the inboard propeller element 200 comprise a sleeve 181, which is telescopically received within a housing 182. The sleeve 181 supports the bearing means 179 for the feedback shaft 178. The sleeve 181 is provided with an interiorly threaded portion having engagement with a high lead screw 183 carrying a worm gear 184. The sleeve 181 is urged to the right, as viewed in Figures 8 and 9, by means of a pair of nested springs 185 and 186. The worm gear 184 meshes with a worm 187 formed on a rotatable shaft 188. The shaft 188 is disposed within the housing 182 and includes a serrated collar portion 189 having a screwdriver slot 190 therein. The serrated collar portion 189 is maintained in engagement with a reciprocable serrated collar 191 by means of a compression spring 192. To effect an adjustment of the feedback shaft 178, it is only necessary to rotate the shaft 188 so as to rotate high lead screw 183, by which means the sleeve 181 may be reciprocated within the housing 182 so as to effect reciprocable movement of the feedback shaft 178. Reciprocable movement of the feedback shaft 178 is permitted by reason of the straight spline connection between the shaft and the sleeve 176. In this manner, the position of the nut 180, which is operatively associated with the distributor valve of the inboard control unit, to be described, can be adjusted so as to correspond to the particular angle at which the blades of the inboard propeller element are positioned.

Figure 13:
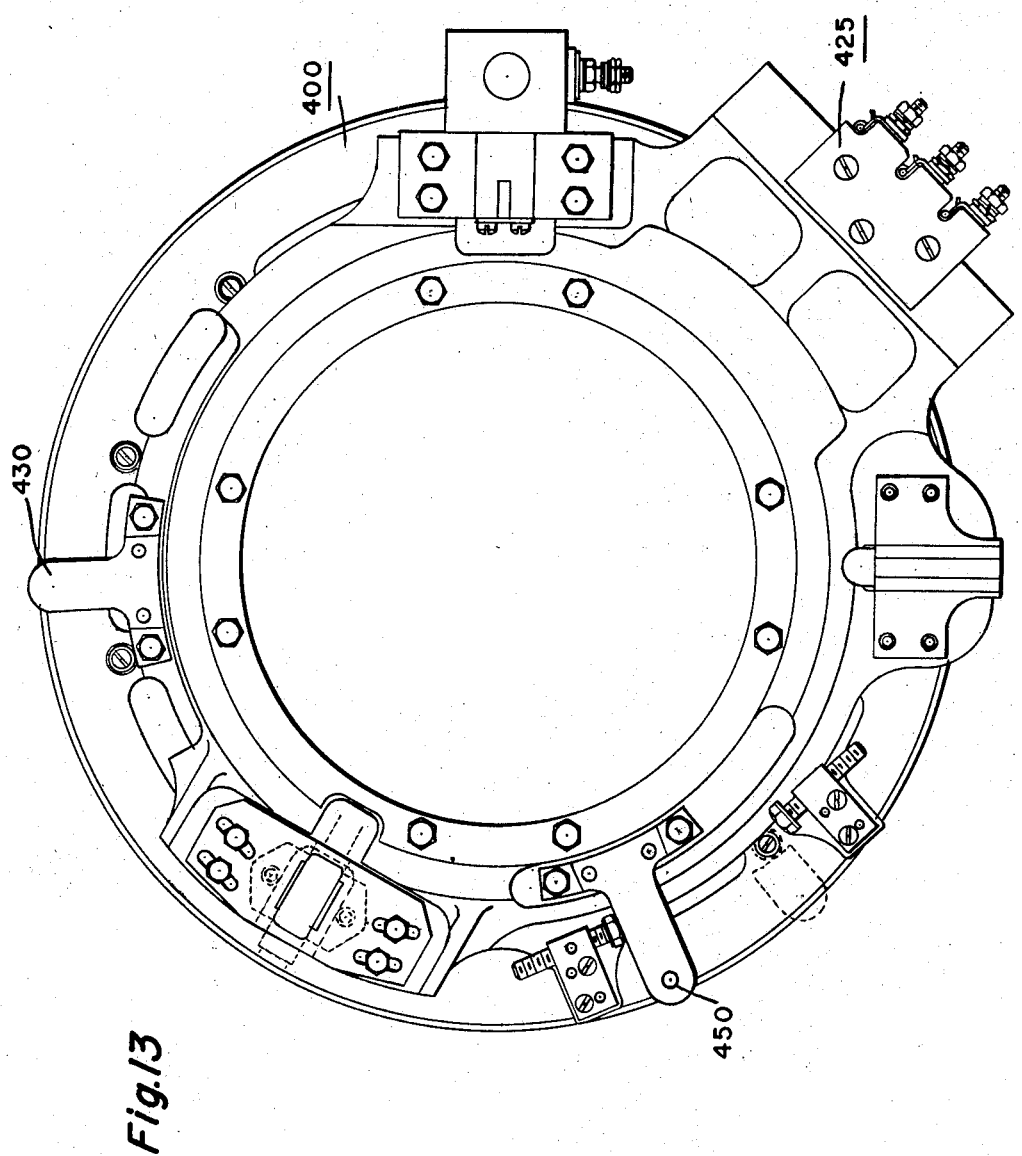
Fig. 13 is a view, in elevation, taken in the direction of arrow 13 in Fig. 1.

Referring particularly to Figures 1, 2B and 13, the mechanism disposed within the control housing 400 will be described. As heretofore alluded to, the control housing is rotatable with the inboard propeller element 200 and carries a slip ring assembly 410, which is connected by a suitable conductor means, such as indicated by the numeral 195 to the feathering pump motor of the inboard control unit 375, and to a second brush assembly 95, which rotates with the inboard propeller element 200. The brush assembly 95 engages a slip ring assembly 96, which rotates with the outboard propeller shaft 40. The slip ring assemblies 96 are, in turn, connected by a suitable conductor means, not shown, with the feathering pump motor of the outboard control unit 350. The brush and slip ring connections to the feathering pump motors of the control units disposed within the regulator 300 may be of the type disclosed in copending application, Serial No. 202,612, filed December 26, 1950, now Patent No. 2,699,304, in the name of Robert C. Treseder, et al. The conductor means, such as 195, are supported in tube assemblies carried between a pair of adapter plates 196 and 197, which are carried by and rotatable with the inboard propeller element 200.

Figure 14:
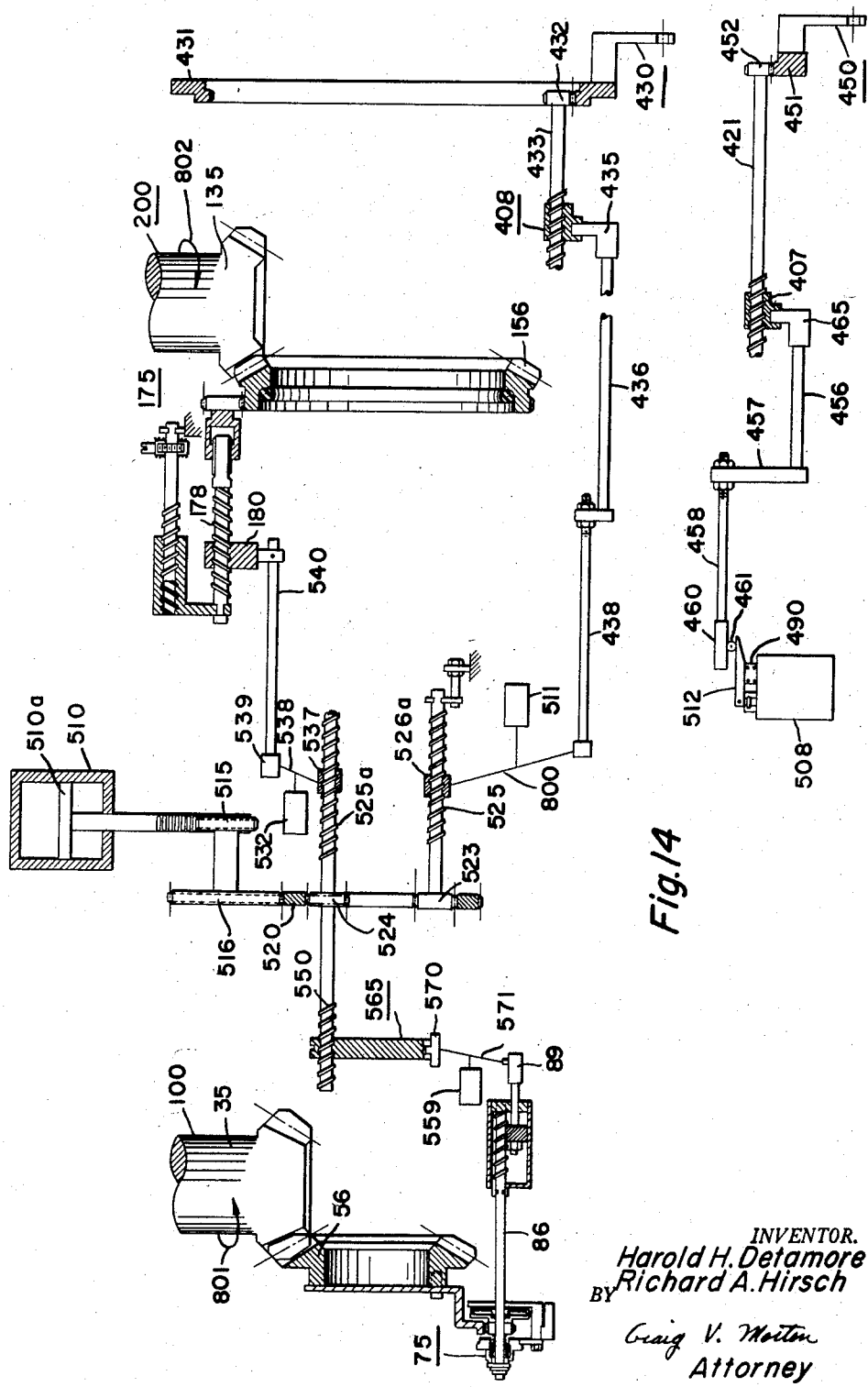
Fig. 14 is a schematic view of the coordinating and control mechanism for the propeller assembly of this invention.

The stationary adapter plate 420 has associated therewith a manual control lever 430 and a governor synchronizing lever 450. The control lever 430 is employed to select the regime of propeller operation, whether it be governing, feathering or negative thrust. The lever 430 is operatively connected to a rotatably mounted ring gear 431, which, as is schematically shown in Fig. 14, meshes with a plurality of pinion gears, such as the one, 432, shown in Fig. 14. Each of the pinion gears is attached to a high lead screw, which there are three in number, which high lead screws are equidistantly spaced apart within the control housing 400, one of the screws being designated by the numeral 433 in Fig. 14. The high lead screws, which are capable of rotation by angular movement of ring gear 431, threadedly engage the control ring 408 within the control housing. A quantity of oil is maintained within the control housing 400 so as to provide lubrication for the various coordinating mechanisms therein.

The governor synchronizing lever 450 is operatively associated with a ring gear 451, which, as is shown in Fig.

14, meshes with a pinion gear 452 carried by the high lead screw 421. It is to be understood that a plurality of pinion gears mesh with the ring gear 452, and each pinion gear is carried by a high lead screw, such as the one indicated by the numeral 421, which high lead screw threadedly engages the control ring 407. It will further be appreciated that angular movement of either of the levers 430 or 450 will effect axial movement of the control rings 407 and 408 relative to the propeller shaft 140.

Figure 15:
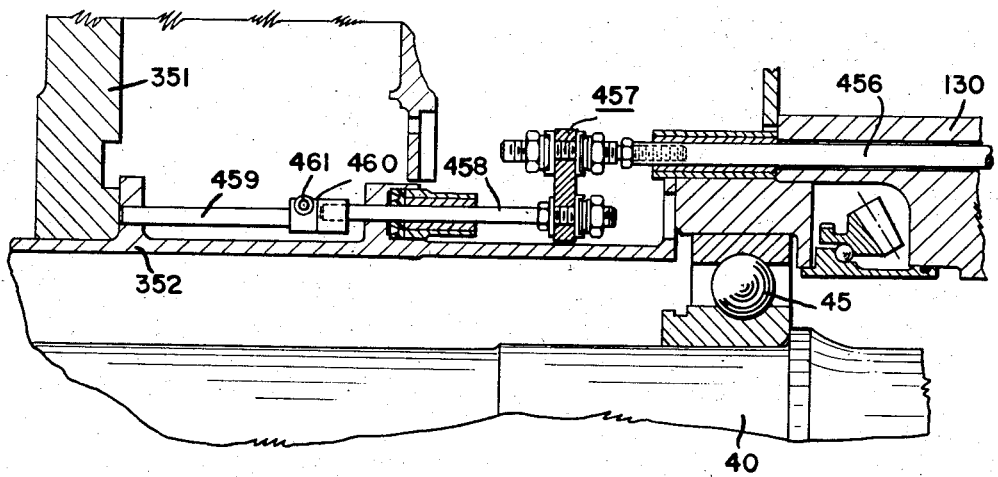
Figs. 15 and 16 are enlarged fragmentary views, partly in section and partly in elevation, of the interconnecting means between the manual control and synchronizing rods and the inboard control unit of the regulator.
Figure 16:
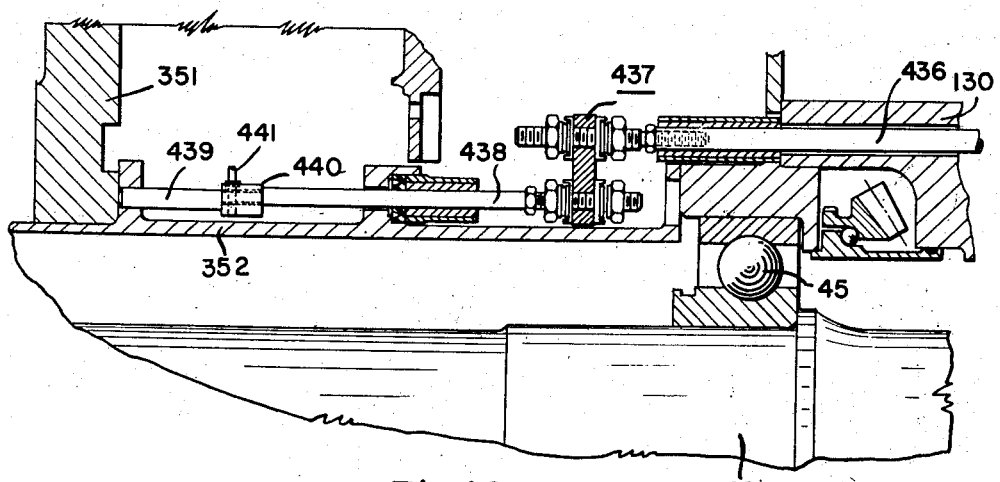

With particular reference to Figures 2B, 15 and 16, the manner in which the control rings 407 and 408 are connected with elements of the inboard control unit 375 will be described. As is shown in Fig. 2B, the control ring 408 has situated therein a shoe 435, which is attached to a reciprocable rod 436. The control rod 436 extends along side the inboard propeller hub 130, and, as shown in Fig. 16, is connected by means of a threaded, adjustable coupling 437 to a second reciprocable control rod 438, which extends into the regulator 300 where it is slidably mounted on a rod 439 rotatable with the plate 351 of the inboard control unit 375. The rod 438 carries a control element 440, which is operatively connected to the beta selector valve of the inboard control unit, to be described.

In a similar manner, the control ring 407 has situated therein a shoe, not shown, which is attached to a rod, such as the one designated by the numeral 456 in Fig. 15. The rod 456 is capable of axial movement relative to the inboard propeller hub 130 and is operatively connected to a second rod 458 through a threaded, adjustable coupling 457. The rod 458, likewise, projects into the regulator 300 and is slidably mounted on a rod 459 attached to the adapter sleeve 352. The rod 458 also carries a control element 460, which is operatively associated with the movable fulcrum point of the governor valve assembly carried by the inboard control unit 375, to be described.

With particular reference to Figures 1 and 2A, it may be seen that the cup-shaped cover 310 of the regulator 300 is provided with a shroud 311, which encompasses a plurality of integral fins 312 formed on the cup-shaped cover 310. The fins 312 are employed to induce air flow between the shroud 311 and the cover 310 in the general direction of arrows 315 in Figure 1. Accordingly, during rotation of the propeller elements, the air flow induced by the fins 312 will serve to cool the regulator 300 so as to prevent the temperature thereof from becoming excessively high. It will be appreciated that some type of cooling is necessary since the regulator 300 houses a reservoir of oil, in which control units that rotate in opposite directions, are disposed.

Referring to Figures 2A, 2B and 12, the components and assembly of the inboard control unit 375 will be described. The particular arrangement of the control valves in the inboard and outboard control units forms no part of this invention, the same being disclosed and claimed in copending application, Serial No. 402,440, filed January 6, 1954, in the name of Harold H. Detamore, et al., and owned by the assignee of this invention. The mounting plate 351 of the inboard control unit 375 has attached thereto a pair of gear type pumps 501 and 502, which are driven by rotation of the propeller. As is seen in Fig. 2A, the pump 501 includes a shaft 503 having attached thereto a pump gear 504. The pump gear 504 meshes with a pump power gear 505, which is carried by the cover 310 of the regulator 300. Inasmuch as the plate 351 and the pump 501 rotate with the inboard propeller element 200, whereas the cover 310 and the pump power gear 505 rotate with the outboard propeller element 100, it will be appreciated that relative rotation will occur between gears 505 and 504, which relative rotation is employed to drive the pumps 501 and 502.

The mounting plate 351 also carries an electric motor operated feathering pump 506 having associated therewith a rotary inlet valve 507, the arrangement being of the type disclosed and claimed in copending application, Serial No. 297,066, filed July 3, 1953, now Patent No. 2,747,593, in the name of Darrell E. Royer. The arrangement of the pumping system including pumps 501, 502 and 506 are such that when the direct driven pumps 501 and 502 do not produce sufficient flow to meet the requirements of the fluid pressure system, the feathering pump 506 will be connected to the system to supplement the flow produced by the direct driven pumps.

The intelligence system for controlling both the inboard and outboard propeller elements comprises a governor valve assembly R. P. M. reset valve and pressure reducing valve designated by the numeral 508, a dual low pitch stop valve assembly 509, a blade angle actuator 510 and a beta selector valve 511. These elements are all mounted on and rotatable with the mounting plate 351. The manner of their interconnection is shown in the aforementioned copending application, Serial No. 402,440, and the structural embodiment of the blade angle actuator 510 is disclosed and claimed in copending application, Serial No. 371,814, filed August 3, 1953, now Patent No. 2,768,612, in the name of Harold H. Detamore, et al. The structural embodiment of the dual low pitch stop valve assembly 509 and the beta selector valve 511 will be described more fully hereinafter.

The beta selector valve 511 is schematically disclosed in the aforementioned copending application Serial No. 402,440, the hydraulic connections between the blade angle actuator and either the beta selector valve or the governor valve assembly also being disclosed in Serial No. 402,440. Structurally, as depicted in Figures 19 through 25, the beta selector valve 511 includes two valves, namely a rotary selector valve comprising sleeve 720 and piston 730, and a governor and beta selector valve comprising sleeve 740 and piston 750. In Serial No. 402,440 the rotary selector valve is shown schematically as five separate valves, namely a feathering selector valve, a feathering selector control valve, a negative transition valve, a beta distributor valve and a governor reset valve. The governor and beta selector valve is designated as the governing and beta selector valve in Serial No. 402,440 and is depicted as being of the linear type having a servo actuated spring biased piston. Moreover, as specifically set forth in Serial No. 402,440, the function of the governor and beta selector valve is to connect the blade angle actuator with either the governor valve assembly or the beta valve. Thus, as disclosed in Serial No. 402,440, during operation of the propeller in the governing regime, the governor valve assembly is connected with the blade angle actuator by the governor and beta selector valve, and the beta valve is disconnected from the blade angle actuator. However, during operation in the negative thrust regime, the beta valve is connected with the blade angle actuator by the governor beta selector valve, and the governor valve assembly is disconnected from the blade angle actuator. Figure 26 depicts the position of the governor and beta selector valve when the beta valve is connected to the blade angle actuator and the governor valve assembly is disconnected therefrom. Figure 27 depicts the position of the governor and beta selector valve when the governor valve assembly is connected with the blade angle actuator and the beta valve is disconnected therefrom.

As is seen in Fig. 12, the governor valve assembly 508 includes a lever 512, one end of which rides on a governor valve carriage 513. The governor valve carriage 513 includes a roller 461, which constitutes the fulcrum point for lever 512, the roller being carried by and movable with the control element 460, shown in Fig. 15. The function of the roller 461 associated with the element 460 is to displace the fulcrum point of the governor valve assembly lever 512 so as to vary the speed setting thereof and enable synchronization of a plurality of propeller assemblies on a multi-engine aircraft.

The blade angle actuator 510 includes a piston, not shown, operatively connected to a rod, which has formed thereon a rack, not shown, that meshes with a pinion gear 515, shown in Fig. 2A. The pinion gear 515 is attached to a shaft, which carries a second pinion gear 516, the pinion gear 516 being carried by and rotatable relative to the mounting plate 351. The pinion gear 516, in turn, meshes with the external teeth of a ring regulator control gear 520. As is shown in Fig. 12, the ring gear 520 has a cam slot 521 therein, the function of which will be described more fully hereinafter. The internally toothed surface of the ring gear 520 meshes with three pinion gears 522, 523 and 524, which are spaced substantially 120° apart within the regulator 300. Pinion gears 523 and 524 have attached thereto high lead screws, such as the one indicated by the numeral 525 in Fig. 2A. Pinion gears 522, 523 and 524 are also drivingly connected with three high lead screws, which extend into the outboard control unit 350 of the regulator 300. As is shown in Fig. 2A, the pinion gear 523 includes a stub shaft 526, which is splinedly connected to a high lead screw 550, which extends into the outboard control unit 350 of the regulator. Each of the pinion gears 522 through 524 are so connected with the high lead screws of the outboard control unit 350 so as to permit limited movement of the pinion gears to compensate for misalignment, or deflection, between the propeller shafts 40 and 140. The spline connection between the pinion gears and the high lead screws of the outboard control units 350 may be of the involute type, or any other type well known in the art.

With reference to Figures 12 and 16, it may be seen that the control element 440 attached to the rod 438 carries a pin 441, which pin is received in a bifurcated arm 530 of the beta selector valve 511. The high lead screw, which is rotatable by pinion gear 523, engages a non-rotatable nut 526a, which also carries a pin, not shown, in Fig. 12, that is received by a second bifurcated arm 531 of the beta selector valve 511. The construction and operation of the beta selector valve 511 will be described hereinafter, and suffice it here to say that manual movements of the arm 530 in response to the movement of the control lever 430, to the negative thrust regime or the feathering regime will disconnect the governor valve assembly 508 and connect the beta valve 511 with the actuator 510 so that the beta valve 511 will control the position of the actuator piston 510a, which will reposition the beta selector valve by rotation of pinion gear 523 through ring gear 520 and pinion gear 516.

The fluid pressure system for actuating the torque units of the inboard propeller element 200 comprises a distributor valve 532, a minimum pressure valve 533, a pressure control valve assembly 534, a pitch lock control valve assembly 535 and a feathering pump control valve 536. These valve elements are, likewise, attached to the mounting plate 351 so as to be rotatable therewith, and are interconnected by tubage assemblies within the plate 351 in a manner similar to that shown in the aforementioned Blanchard, et al. patents. The manner in which the several valve elements are interconnected is, likewise, shown in the aforementioned copending application, Serial No. 402,440, and suffice it here to say that the distributor valve controls the application of pressure fluid to the torque units of the inboard propeller element. Moreover, the increase pitch line from the distributor valve, not shown, includes a pitch lock valve of the type disclosed and claimed in copending application, Serial No. 276,292, filed March 13, 1952, now abandoned, in the name of Kenneth L. Berninger, et al., which valve is mounted in the inboard hub, not shown. The input for the distributor valve is derived from pinion gear 524, which drives a high lead screw having threaded engagement with a nut 537, such that rotation of the high lead screw by the pinion gear 524 will effect reciprocable movement of the nut 537. The nut 537 is connected to one end of a distributor valve control lever 538, the intermediate point of which is attached to the distributor valve piston through cam means, not sown. The other end of the distributor valve control lever 538 is attached to a member 539, which is carried by a rod 540 that is mounted for reciprocable movement, the rod 540 being operatively connected with the nut 180 of the rotary feedback mechanism 175 of the inboard propeller element 200, as shown in Figures 8 through 10. Accordingly, when the blade angle actuator 510 is operated so as to demand a change in the pitch position of the inboard propeller element, rotation will be imparted to ring gear 520 and pinion gear 524 so as to effect movement of the nut 537 and, thus, actuate the distributor valve piston. When the adjustment in pitch has been accomplished by the torque units of the inboard propeller element, the feedback mechanism 175 will actuate the rod 540 and the member 539 so as to reposition the distributor valve piston, and block further flow of fluid to and from the inboard torque units. The function and operation of the entire actuating system for the inboard propeller element torque units is more fully disclosed in the aforementioned copending application, Serial No. 402,440. The mounting plate 351 carries a shroud 542, which prevents violent turning action of the oil within the regulator.

Referring with particular reference to Figures 2A and 11, the outboard control unit 350 will be described. The control unit 350 also includes a pair of gear type pumps 551, 552, which are driven by rotation of the regulator 300. As shown in Fig. 2A, the pump 552 includes a shaft 553 having attached thereto a pump gear 554, which meshes with a pump power gear 555 carried by the mounting plate 351 of the inboard control unit. As the pump 552 rotates with the outboard propeller element 100 and the mounting plate 351 rotates with the inboard propeller element 200, it will be appreciated that relative rotation will occur between gears 554 and 555, inasmuch as the inboard and outboard propeller elements rotate in opposite directions. Accordingly, during rotation of the propeller elements, the pumps 551 and 552 will be rendered operative. The outboard control unit 350 also includes an electric motor driven feathering pump 556 having associated therewith a rotary inlet valve 557. The connection of the feathering pump to the system supplied normally by the direct driven pumps 551 and 552 is controlled by a feathering pump control valve 558.

Inasmuch as the intelligence system for the outboard propeller element 100 and the outboard control unit 350 is carried by the inboard control unit 375, the outboard control unit 350 is of much simpler design and merely includes a distributor valve 559, a pressure control valve assembly 560, and a pitch lock control valve assembly 561. The mounting plate 301 also carries a breather valve 562 of conventional design, which maintains substantially atmospheric pressure within the reservoir formed by the regulator assembly 300. As is shown in Fig. 11, the cup-shaped cover 310 also includes a plug 563, which may be removed to fill the reservoir with oil.

As is shown in Fig. 2A, the high lead screws 550, which are driven by the regulator control gear 520, readily engage a control ring 565, such that rotation of the high lead screw will impart axial movement to the control ring. The ends of the high lead screws 550 are journaled in a second control ring 566, which is attached to the plate member 301 through a plurality of shoes, not shown in Fig. 2A, riding in the groove of the control ring, the function of the control ring 566 being to maintain the control ring 565 in parallelism with the plate 301. As is shown in Fig. 11, the control ring 566 has situated in its annular groove three shoes, 567, 568 and 569, which are attached to the plate member 301. The control ring 565 has riding in its annular groove a shoe 570, which is attached to one end of the distributor valve lever 571 for the distributor valve 559. The intermediate point of the lever 571 is attached to the distributor valve piston through cam means, not shown, and the other end of lever 571 is attached to the rod 89 of the outboard feedback mechanism 75. Accordingly, it will be apparent that operation of the actuator 510 of the inboard control unit 375 will operate the distributor valves of both the inboard and outboard control units simultaneously, and the feedback mechanism associated with each propeller unit element will reposition the distributor valve pistons when the blade angle change demanded by the actuator has been accomplished by the torque units of each propeller elements.

With reference to Figures 17 and 18, the construction and operation of the dual low pitch stop valve assembly 509 will be described. The construction of the valve assembly is shown in cross section in Fig. 18, this construction being similar to that disclosed and claimed in copending application, Serial No. 269,672, filed February 2, 1952, now Patent No. 2,798,563 in the name of Dale W. Miller, et al. Briefly, the dual low pitch stop valve assembly comprises a housing 600 having disposed therein a movable valve sleeve 601 and a movable valve piston 602. The piston 602 is provided with a pair of spaced lands 603 and 604 and is operatively connected to a rod 605 having attached thereto a pin 606, which rides in the cam slot 521 of the regulator control gear 520. Inasmuch as each pitch position of the blades of both the inboard and outboard propeller elements is represented by the angular position of gear 520, it will be appreciated that the position of the piston 602 will vary with adjustment of the pitch position of the blades in the propeller assembly. The valve sleeve 601 includes a series of circumferentially spaced inlet ports 607, which are always in communication with a series of circumferentially spaced supply ports 608 in the valve housing 600. The valve sleeve 601 also includes a series of circumferentially spaced outlet ports 609, which connect with a servo chamber 610 formed within the valve housing 600. With the piston 602 in the position shown in Fig. 18, the servo chamber 610 is connected to drain through port 609, the hollow piston 602 and the hollow rod 605. In this position, a spring 611 will assist centrifugal force in maintaining the sleeve 601 against the end of the end wall of housing 600, so that the series of outlet ports 612 in the housing 600 will be connected to drain. However, when the piston 602 is moved upwardly, as viewed in Fig. 18, due to clockwise rotation of the gear 520, as viewed in Fig. 17, pressure fluid will be admitted through ports 607 and 609 to the servo chamber 610 so as to force the sleeve 601 downwardly against a stop 613, in which position, inlet and outlet ports 608 and 612 of the housing 600 will be connected. The function of the low dual pitch stop valve assembly in establishing either two mechanical pitch stops in the actuator 510 is more fully disclosed in the aforementioned copending application Serial No. 402,440.

Referring more particularly to Figures 19 through 25, the physical embodiment of the beta selector valve 511 will be described. The beta selector valve 511 includes a housing 700, which is attached to the mounting plate 351 so as to be radially aligned with respect to the axis of rotation thereof. As is seen particularly in Fig. 21, the housing 700 includes a pair of through bores 701 and 702. Disposed within the through bore 701 is a stationary valve guide 703 comprising two parts 703a and 703b having a plurality of port openings 704, 705, 706, 707 and 708. The ports 704 are connected by a passage 709 with the through bore 702, and the port 707 is connected by a passage 710 with the through bore 702. Rotatably journaled within the valve guide 703 is a valve sleeve 720, and rotatably journaled within the valve sleeve 720 is a valve piston 730. The valve sleeve 720 has attached thereto the bifurcated arm 530 and the valve piston has attached thereto the bifurcated arm 531. The bifurcated arm 530 receives the pin 441 and the bifurcated arm 531 receives a pin 532a. Accordingly, manual control by the control lever 430 is effective to rotate the valve sleeve 720, while the actuator feedback repositions the piston 730.

Disposed within the through bore 702 of the housing 700 is a stationary valve sleeve 740 having a plurality of sets of circumferentially spaced ports 741, 742 and 743. Disposed within the valve guide 740 is a piston 750 loaded by a spring 751. Pressure fluid from port 704 of the rotary selector valve and communicated to the through bore 702, which is closed by an end plate 745, maintains the piston 750 in the position shown in Fig. 21 in the governing regime. The piston and sleeve combination 740 and 750 comprises a governor and beta selector valve.

The governor and beta selector valve comprising sleeve 740 and piston 750 controls the connection of either the governor valve assembly 508 or the beta valve including valve sleeve 720 and valve piston 730 with the actuator 510. When the control lever 430 is in the governing regime, the valve sleeve 720 is maintained in the position depicted in Figure 22, and in this position port 704 is connected to fluid under pressure so that the piston 750 is maintained in the position of Figure 21 wherein ports 742 and 743 in the sleeve 740 are connected. When ports 742 and 743 are connected by the piston 750, the governor valve assembly 508 is connected to and controls the flow of fluid to and from the blade angle actuator 510, and the beta valve is disconnected from the blade angle actuator. During movements of the blade angle actuator 510 under control of the governor valve assembly 508, the distributor valves of both the inboard and outboard propeller units will be actuated and their respective feedback shafts will reposition the distributor valve when the pitch change demanded by the blade angle actuator has been accomplished. Movement of the blade angle actuator will also actuate the high lead screw 525 which is operatively connected with the piston 730 of the beta valve. However, since the beta valve is not connected with the blade angle actuator 510 at this time, movement of the piston 730 does not have any controlling effect on the blade angle actuator. During operation in the governing regime, the dual low pitch stop valve controls the position of the mechanical stop in the blade angle actuator 510.

Upon movement of the control lever to either the negative thrust regime or the feathering regime, the port 704 is connected to drain by the valve sleeve 720, and accordingly spring 751 moves the piston 750 of the governor and beta selector valve upwardly so that the piston 750 connects sleeve ports 741 and 742. When ports 741 and 742 are connected by the piston 750, the beta valve comprising valve sleeve 720 and valve piston 730, is connected with the blade angle actuator 510 and the governor valve assembly 508 is disconnected from the blade angle actuator. Thus, the beta valve controls the flow of fluid to and from the blade angle actuator 510 to manually control the pitch position of the propeller blades.

With reference to Figure 26, the beta valve comprising sleeve 720 and piston 730 is connected by passages 709 and 710 with the beta selector valve including piston 750. When the passage 709 is connected to drain by movement of the control lever to either the negative thrust regime or the feathering regime, the spring 751 moves the piston 750 upwardly to interconnect ports 741 and 742 as shown in Figure 26. Port 742 is connected by a passage 510b to the blade angle actuator 510, and accordingly, the flow of fluid to and from the blade angle actuator 510 is controlled by the beta valve through passage 710, ports 741 and 742 and passage 510b. As seen in Figure 26, when the beta valve controls fluid flow to and from the blade angle actuator 510, the governor valve assembly 508 which is connected to passage 508b and port 743, is disconnected from the blade angle actuator.

With reference to Figure 27, when the control lever 430 is in the governing regime, pressure is supplied to the upper end of governor and beta selector valve piston 750 through passage 709 thereby moving the piston 750 downwardly so as to interconnect ports 742 and 743. Under these conditions, the governor valve assembly 508 controls the flow of fluid to and from the blade angle actuator 510 through passage 508b, ports 743 and 742 and passage 510b. Moreover, when the governor valve assembly 508 is connected to the blade angle actuator 510, the beta valve is disconnected from the blade angle actuator since the connection between ports 741 and 742 is blocked.

Referring to Fig. 14, the coordinating mechanism between the control housing and the regulator, and the mechanism between each of the control units and their perspective propeller elements will now be described. Blade 35 of the outboard propeller element is shown having an integral bevel gear, which meshes with the master gear 56 of the outboard propeller element. The master gear 56, in turn, controls the rotational movement of the outboard feedback mechanism 75, which controls the lineal movement of the outboard feedback shaft 89. The feedback shaft 89 is shown connected to one end of lever 571, the intermediate point of which is connected to the piston of the outboard distributor valve 559. The other end of lever 571 is connected to control shoe 570, which rides in control ring 565 is, in turn, shown as threadedly engaging the high lead screw 550, which is rotated by pinion gear 524 from the regulator control, or ring gear, 520.

The ring gear 520 is shown meshing with the actuator driven pinion gear 516, which is driven by pinion gear 515, which meshes with the rack formed on the rod of the piston forming a component part of the blade angle actuator 510. The pinion gear 524 is also shown as drivingly connected to a high lead screw 525a, which threadedly engages a nut 537, which is connected to one end of the lever 538. The intermediate point of the lever 538 is operatively connected with the piston of the inboard distributor valve 532, and the other end of lever 538 is operatively connected to a member 539, which is connected with the rod 540 of the inboard propeller element 200. As shown, the rod 540 is connected to the nut 180, which threadedly engages the high lead screw 178 of the rotary feedback mechanism 175 associated with the master gear 156 of the inboard propeller element.

The ring gear 520 is also shown driving the pinion gear 523, which rotates the high lead screw 525 that threadedly engages the nut 526a, which is shown as schematically attached to a lever 800. The intermediate point of the lever is operatively connected to the beta selector valve 511, and the other end of the lever 800 is operatively connected with the rod 438. This showing is schematic, inasmuch as it will be appreciated that the connection between the rod 438 and nut 526a are employed to rotate parts of the beta selector valve 511, rather than impart linear motion thereto. The rod 438 is shown connected to the rod 436, which carries the control shoe 435 riding in control ring 408 of the control mechanism housing 400. The control ring 408 may be reciprocated by rotation of high lead screw 433, which is connected to the pilot's control lever 430 through the ring gear 431 and pinion gear 432.

Figure 14 also depicts the synchronizing connection between the lever 450 and the governor valve assembly 508. This mechanism includes the ring gear 451 meshing with the pinion 452 for rotating the high lead screw 421. The high lead screw 421, in turn, threadedly engages control ring 407 in which a shoe 465 is disposed. The shoe 465 is, in turn, connected to the rod 456 through the coupling 457 to the rod 458. The rod 458 carries the element 460, which includes the roller 461 that constitutes the fulcrum point for the governor valve assembly lever 512. Linear movement of the roller 461 will vary the fulcrum point of the lever 512 so as to vary the effective force of governor valve spring 490, which opposes the thrust of centrifugal force.

The operation of the coordinating mechanism, shown in Fig. 14, will now be described. If the actuator piston 510a is moved downwardly, as viewed in Fig. 14, the pinion gear 516 will be rotated in a clockwise direction, which will impart counterclockwise movement to high lead screws 525, 525a and 550. Counterclockwise rotation of high lead screw 550 will effect linear movement of the control ring 565 to the left, as viewed in the drawing, so as to position the piston of the distributor valve 559 to apply fluid pressure to the torque units of the outboard propeller element 100 so as to increase the pitch position of the blades thereof. The direction of increase pitch of the outboard blades 35 is indicated by the arrow 801.

Counterclockwise rotation of high lead screw 525a will, likewise, effect movement of nut 537 to the left so as to position the piston of the distributor valve 532 so that fluid pressure is applied to the torque units of the inboard propeller element 200 so as to increase the pitch position thereof. The direction of increase pitch movement of the blades 135 is shown by arrow 802. Accordingly, it is readily apparent that operation of the actuator will simultaneously adjust the distributor valves of the inboard and outboard propeller elements so as to effect coincident pitch adjustment of the inboard and outboard propeller blades.

The blades 35 of the outboard propeller element 100 in moving to an increased pitch position will rotate master blade gear 56 in a counterclockwise direction, which will effect rotation of feedback shaft 86 in a clockwise direction so as to effect movement of the feedback rod 89 to the right, as viewed in Fig. 14. Accordingly, the feedback mechanism 75 will reposition the distributor valve 559 of the outboard control unit so as to shut off the flow of fluid to the outboard torque units when the pitch adjustment demanded by the actuator 510 has been accomplished by the outboard torque units. In a similar manner, rotation of the blades 135 of the inboard propeller elements about their longitudinal axes towards an increased pitch position will effect counterclockwise rotation of high lead screw 178, which by reason of having left-hand threads will effect movement of nut 180 to the right, as viewed in Figure 14. Thus, the feedback rod 540 will be moved to the right to thereby reposition the piston of the inboard distributor valve 532.

If the pilot wishes to select any of the several regimes of propeller operation, he need only operate the control lever 430, which will actuate the beta selector valve 511. The beta selector valve 511 may be adjusted so as to directly control the actuator 510 in which instance, rotation of the ring gear 520 by the actuator 510 will reposition the beta selector valve 511 by rotation of high lead screw 525a through the linkage comprising elements 526a and 800. In the governing regime the governor valve assembly 508 controls the actuator 510, while in the other regimes, namely feathering and negative thrust, the beta selector valve 511 controls the actuator 510.

From the foregoing, it is manifest that the present invention provides a propeller assembly including means for effecting substantially coincident pitch adjustment of the blades of both the inboard and outboard propeller elements. Furthermore, the herein disclosed propeller assembly employs only a single regulator assembly for controlling the pitch adjustment of both propeller elements. Moreover, the coordinating mechanism between the blade angle actuator in both propeller units is of simplified design and construction.

While the embodiment of the present invention as herein disclosed, constitutes a preferred form, it is to be understod that other forms might be adopted.

What is claimed is as follows:

1. In a contra-rotating propeller, a pair of hubs adapted to be driven in opposite directions by a pair of oppositely rotating drive shafts, each hub having a plurality of blade sockets adapted to receive and adjustably support propeller blades, power actuated means carried by each hub for adjusting the pitch position of said blades, a unitary regulator assembly mounted between said hubs including a control unit operatively connected to and rotatable with each hub, each control unit including means energized by rotation of said hubs for developing power to effect actuation of said power actuated means, control means in each control unit-hub combination including a follow-up connection with the propeller blades of that hub for controlling the application of said developed power to effect an adjustment in the pitch position of said blades, and means operatively connected with the control means of each control unit-hub combination for actuating and coordinating the actuation of said control means in both control unit-hub combinations to coordinate the pitch adjustment of the blades of said two hubs.

2. In a contra-rotating propeller, a pair of hubs adapted to be driven in opposite directions from a pair of oppositely rotating drive shafts, each hub having a plurality of blade sockets adapted to receive and adjustably support propeller blades, power actuated means carried by each hub for adjusting the pitch of said blades, a unitary regulator assembly mounted between said hubs including a control unit rotatable with each hub, means carried by each control unit and energized by rotation of said hubs for developing power to effect actuation of said power actuated means, control means in each control unit-hub combination including a follow-up connection with the propeller blades of that hub for controlling the application of said developed power to effect an adjustment in the pitch position of said blades, and means carried by one control unit and operatively connected with the control means of both control units including an actuator operatively connected to a master control gear within said regulator assembly for actuating and coordinating the actuation of said control means in both control units to coordinate the pitch adjustment of the blades of said two hubs.

3. In a contra-rotating propeller, a pair of hubs adapted to be driven in opposite directions from a pair of oppositely rotating drive shafts, each hub having a plurality of blade sockets adapted to receive and adjustably support propeller blades, power actuated means carried by each hub for adjusting the pitch of said blade, a unitary regulator assembly mounted between said hubs including a control unit operatively connected to and rotatable with each hub, means carried by each control unit and energized by rotation of said hubs for developing power to effect actuation of said power actuated means, means rotatable with one of said control units and operatively connected with the control means of each control unit including an actuator operatively connected to a master regulator gear and means interconnecting the regulator gear and the control means of each control unit for coordinating and actuating the control means of both control units to coordinate the pitch adjustment of the blades of said two hubs.

4. An engine-propeller combination including, a pair of axially spaced propeller hubs, each of which supports a propeller having a plurality of blades mounted for pitch adjustment, shaft means operatively connected with said hubs for rotating the said hubs in opposite directions, a unitary regulator assembly mounted between said hubs including a control unit operatively connected to and rotatable with each hub, means within each control unit for developing a source of fluid pressure during propeller rotation, torque units mounted on the hubs and operatively connected with the propeller blades thereof for adjusting the pitch position of said blades, means interconnecting said sources of fluid pressure with said torque units, an actuator carried by one of said control units, means interconnecting the source of fluid pressure within said one control unit with said actuator, means associated with said last recited interconnecting means for controlling fluid flow to and from said actuator, and means operatively connected with said actuator and responsive to movements thereof for controlling the application of fluid pressure from said sources to the torque units of both hubs whereby adjustments in the pitch position of the blades of both propellers are subservient to the movements of said actuator.

5. In combination with a variable pitch propeller of the type having an inboard propeller element and an outboard propeller element, each propeller element having power actuated means for adjusting the pitch position thereof and control means for the pitch adjusting means, and means for rotating the propeller elements in opposite directions; a unitary regulator assembly mounted between said hubs including a control unit operatively connected to and rotatable with each propeller element, an actuator carried by the inboard control unit for controlling the pitch adjustment of the blades in both propeller elements, and means including a master regulator control gear carried by said regulator assembly and operatively connected to said actuator for interconnecting the actuator and the control means of each propeller element to effect substantially coincident pitch adjustment of the blades of both propeller elements.

6. In a contra-rotating propeller, a pair of hubs adapted to be driven in opposite directions from a pair of oppositely rotating drive shafts, each hub having a plurality of blade sockets adapted to receive and adjustably support propeller blades, fluid pressure actuated means carried by each hub for adjusting the pitch of said blades, a unitary regulator assembly mounted between said hubs and including control units operatively connected to and rotatable with each hub, said unitary regulator assembly constituting a fluid reservoir, pumps carried by each control unit for drawing fluid from the common reservoir, increasing its pressure, and directing it to the pitch adjusting means under the control of valve means, and means disposed in said regulator assembly and operatively connected to the valve means for coordinating and effecting substantially coincident pitch adjustment of the blades of both hubs.

7. The combination with a variable pitch propeller of the type having an inboard propeller element and an outboard propeller element, fluid pressure actuated means carried by each propeller element for adjusting the pitch position thereof, and means for rotating the propeller elements in opposite directions; of a unitary regulator assembly mounted between said propeller elements including a control unit connected to and rotatable with each propeller element for controlling the actuation of said pitch adjusting means of its respective propeller element, and means disposed in said regulator assembly for controlling the operation of both control units.

8. The combination with a variable pitch propeller of the type having an inboard propeller element and an outboard propeller element, power actuated means carried by each propeller element for adjusting the pitch position thereof, and means for rotating the propeller elements in opposite directions; of a unitary regulator assembly mounted between said propeller elements including a control unit connected to and rotatable with each propeller element, each control unit including means energized by rotation of said propeller elements for developing power to effect actuation of said pitch adjusting means, and means for controlling the application of said developed power to said pitch adjusting means.

9. The combination with a variable pitch propeller of the type having an inboard propeller element and an outboard propeller element, power actuated means carried by each propeller element for adjusting the pitch position thereof, and means for rotating the propeller elements in opposite directions; of a unitary regulator assembly mounted between said propeller elements including a control unit connected to and rotatable with each propeller element, each control unit including means energized by rotation of said propeller elements for developing power to effect actuation of said pitch adjusting means and means for controlling the application of said developed power to said pitch adjusting means, and means disposed in said regulator assembly for controlling the operation of the second recited means of both control units.

10. The combination with a variable pitch propeller of the type having an inboard propeller element and an outboard propeller element, fluid pressure actuated means carried by each propeller element for adjusting the pitch position thereof, and means for rotating the propeller elements in opposite directions; of a unitary regulator assembly mounted between said propeller elements including a control unit connected to and rotatable with each propeller element, said regulator assembly constituting a fluid reservoir, each control unit including a plurality of pumps driven by rotation of said propeller elements for increasing the pressure of fluid in said reservoir and valve means for controlling the application of said pressure fluid to said pitch adjusting means, and a fluid pressure operated actuator disposed within said regulator assembly and operatively connected with the valve means of both control units for controlling the operation thereof.

11. The combination with a variable pitch propeller of the type having an inboard propeller element and an outboard propeller element, fluid pressure actuated means carried by each propeller element for adjusting the pitch position thereof, and means for rotating the propeller elements in opposite directions; of a unitary regulator assembly mounted between said propeller elements including a control unit connected to and rotatable with each propeller element, said regulator assembly constituting a fluid reservoir, each control unit including a plurality of pumps driven by rotation of said propeller elements for increasing the pressure of fluid in said reservoir and valve means for controlling the application of said pressure fluid to said pitch adjusting means, and means disposed in said regulator assembly for controlling the operation of the valve means of both control units.

12. The combination with a variable pitch propeller of the type having an outboard propeller element and an inboard propeller element, fluid pressure actuated means carried by each propeller element for adjusting the pitch position thereof, and means for rotating the propeller elements in opposite directions; of a unitary regulator assembly mounted between said propeller elements including a control unit connected to and rotatable with each propeller element and a cover operatively connected to and rotatable with the outboard propeller element, each control unit including a member operatively connected to and rotatable with one of said propeller elements, said regulator assembly constituting a fluid reservoir, each of said members carrying a plurality of pumps driven by rotation of said propeller elements for increasing the pressure of fluid in said reservoir and valve means for controlling the application of pressure fluid to said pitch adjusting means, and a fluid pressure operated actuator disposed within said regulator assembly and operatively connected with the valve means of both control units for controlling the operation thereof.

13. The combination with a variable pitch propeller of the type having an inboard propeller element and an outboard propeller element, fluid pressure actuated means carried by each propeller element for adjusting the pitch position thereof, and means for rotating the propeller elements in opposite directions; of a unitary regulator assembly mounted between said propeller elements including a control unit connected to and rotatable with each propeller element having a member connected to and rotatable with each propeller element, said regulator assembly constituting a fluid reservoir, each of said members carrying a plurality of pumps driven by rotation of said propeller elements for increasing the pressure of fluid in said reservoir and valve means for controlling the application of said pressure fluid to said pitch adjusting means, and means disposed in said regulator assembly for controlling the operation of said valve means.

14. The combination set forth in claim 13 wherein said unitary regulator assembly includes a cover connected to and rotatable with the outboard propeller element, and wherein said pumps are driven by reason of relative rotation between said cover and said member attached to said inboard propeller element.

15. The combination with a variable pitch propeller of the type having an inboard propeller element and an outboard propeller element, power actuated means carried by each propeller element for adjusting the pitch position thereof, and means for rotating the propeller elements in opposite directions; of a unitary regulator assembly mounted between said propeller elements including a control unit connected to and rotatable with each propeller element, means carried by each control unit and energized by rotation of said propeller elements for developing power to effect actuation of said pitch adjusting means, and a control gear disposed in said regulator and mounted for rotation relative thereto, said control gear having operative connection with the control units of both propeller elements for controlling the operation of both control units.

16. The combination set forth in claim 15 wherein said unitary regulator assembly includes an actuator operatively connected to said control gear for effecting relative rotation thereof with respect to the regulator assembly, and manually controlled means for effecting operation of said actuator.

17. The combination with a variable pitch propeller of the type having an inboard propeller element and an outboard propeller element, power actuated means carried by each propeller element for adjusting the pitch position thereof, means for rotating propeller elements in opposite directions, and means for establishing flight and ground low pitch stops for said propeller elements; of a unitary regulator assembly mounted between said propeller elements and including a control unit connected to and rotatable with each of said propeller elements for controlling the actuation of said pitch adjusting means, said regulator assembly including a control gear, the position of which is indicative of the pitch position of said propeller elements, and valve means carried by one of said control units and operatively associated with said control gear for controlling the establishment of said flight and ground low pitch stops.

18. The combination set forth in claim 17 wherein said valve means comprises a dual low pitch stop valve assembly having a servo actuated valve sleeve and a mechanically actuated valve piston, and wherein said control gear is provided with a cam slot, the piston of said dual low pitch stop valve assembly being operatively connected with said cam slot so as to be reciprocated upon rotative movement of said control gear.

19. The combination set forth in claim 17 wherein the unitary regulator assembly carries an actuator which is operatively connected with the control units of both propeller elements, and wherein the dual low pitch stop valve assembly controls the position of a mechanical stop within said actuator.

20. In a contra-rotating propeller, a pair of hubs adapted to be received in tandem relation upon a pair of oppositely rotating drive shafts, a plurality of adjustable pitch blades mounted upon each hub, fluid pressure actuated means for effecting pitch adjustment of said blades in each hub, a unitary regulator assembly mounted between said hubs including fluid pressure developing means, independent control means for the pitch adjusting means of each propeller hub, and means disposed within and carried by said regulator assembly for effecting cojoint operation of said independent control means.

21. In a contra-rotating propeller, a pair of hubs adapted to be received in tandem relation upon a pair of oppositely rotating drive shafts, a plurality of adjustable pitch blades mounted upon each hub, independent fluid pressure actuated means for effecting pitch adjustment of the blades of each hub, a unitary regulator assembly mounted between said hubs including fluid pressure developing means, independent control means for the pitch adjusting means of each hub, means disposed within said regulator assembly for effecting cojoint operation of said independent control means to initiate the supply of pressure fluid to said pitch adjusting means, and independent means in each propeller hub and connected with its respective independent control means for terminating the supply of pressure fluid to its pitch adjusting means when the pitch adjustment demanded by said cojoint operating means has been achieved by the independent pitch adjusting means of its respective propeller hub.

References Cited in the file of this patent

UNITED STATES PATENTS

| | | |
|---|---|---|
| 2,533,346 | Brady et al. | Dec. 12, 1950 |
| 2,619,182 | Martin | Nov. 25, 1952 |
| 2,679,907 | Frankland | June 1, 1954 |

FOREIGN PATENTS

| | | |
|---|---|---|
| 896,597 | Germany | Dec. 7, 1953 |